United States Patent
Li et al.

(10) Patent No.: US 9,325,620 B2
(45) Date of Patent: Apr. 26, 2016

(54) CHANNEL LOAD BALANCING SYSTEM

(71) Applicant: Cisco Technology, Inc., San Jose, CA (US)

(72) Inventors: Zhizhou Li, Shanghai (CN); Xuan Wang, Shanghai (CN); Zhaode Liu, Shanghai (CN); Jingfeng Zhang, Tianjin (CN)

(73) Assignee: Cisco Technology, Inc., San Jose, CA (US)

( * ) Notice: Subject to any disclaimer, the term of this patent is extended or adjusted under 35 U.S.C. 154(b) by 156 days.

(21) Appl. No.: 14/035,327

(22) Filed: Sep. 24, 2013

(65) Prior Publication Data

US 2015/0085649 A1 Mar. 26, 2015

(51) Int. Cl.
*H04J 1/16* (2006.01)
*H04L 12/803* (2013.01)

(52) U.S. Cl.
CPC .................. *H04L 47/125* (2013.01)

(58) Field of Classification Search
CPC ....................................... H04L 47/125
See application file for complete search history.

(56) References Cited

U.S. PATENT DOCUMENTS

| 7,397,846 | B1 * | 7/2008 | Beser ............................. 375/222 |
| 2004/0120518 | A1 * | 6/2004 | Macy et al. ..................... 380/29 |
| 2009/0138582 | A1 * | 5/2009 | Turk ............................. 709/223 |
| 2013/0088961 | A1 * | 4/2013 | Ramachandran et al. .... 370/235 |
| 2014/0185428 | A1 * | 7/2014 | Thibeault et al. ............ 370/225 |

\* cited by examiner

*Primary Examiner* — Kan Yuen

(57) ABSTRACT

In one example, an apparatus, by a processor, can identify a number of modems in each bonding group of a plurality of bonding groups, resulting in a first data structure. The apparatus can also determine a configuration for each bonding group of the plurality of bonding groups, resulting in a second data structure. The apparatus can also determine channel load for each channel of a plurality of channels, according to the first data structure and the second data structure, resulting in a third data structure.

16 Claims, 8 Drawing Sheets

$$R = BC$$

$$b0 = \begin{bmatrix} 1 \\ 1 \\ 1 \\ 0 \end{bmatrix} \quad b1 = \begin{bmatrix} 0 \\ 1 \\ 1 \\ 1 \end{bmatrix} \quad b2 = \begin{bmatrix} 1 \\ 0 \\ 1 \\ 1 \end{bmatrix}$$

$$b3 = \begin{bmatrix} 1 \\ 1 \\ 0 \\ 1 \end{bmatrix}$$

$$LB[R] = Var(r1, r2, \ldots, rn)$$

Example: 4 RF channel $$LB[R] = (b33 - b23)^2 + (b33 - b23)^2 + (b33 - b23)^2 + (b33 - b23)^2 + (b33 - b23)^2 + (b33 - b23)^2$$
502

$$LB[R] = \big(3\,b33^2 + (-2\,b23 - 2\,b13 - 2\,b03)\,b33 + 3\,b23^2 + (-2\,b13 - 2\,b03)\,b23 + 3\,b13^2 - 2\,b03\,b13 + 3\,b03^2\big)\,c4^2 +$$
$$\big((6\,b32 - 2\,b22 - 2\,b12 - 2\,b02)\,b33 + (-2\,b23 - 2\,b13 - 2\,b03)\,b32 + (6\,b22 - 2\,b12 - 2\,b02)\,b23 +$$
$$(-2\,b13 - 2\,b03)\,b22 + (6\,b12 - 2\,b02)\,b13 - 2\,b03\,b12 + 6\,b02\,b03\big)\,c3 + \big((6\,b31 - 2\,b21 - 2\,b11 - 2\,b01)$$
$$b33 - 2\,b03\,b31 + 6\,b01\,b03\big)\,b23 + \big((6\,b21 - 2\,b11 - 2\,b01)\,b21 + (6\,b11 - 2\,b01)$$
$$b13 - 2\,b03\,b11 + 6\,b01\,b03\big)\,b33 + \big((-2\,b13 - 2\,b03)\,b33 + (-2\,b13 - 2\,b03)\,b30 +$$
$$(6\,b20 - 2\,b10 - 2\,b00)\,b23 + (-2\,b13 - 2\,b03)\,b20 + (6\,b10 - 2\,b00)\,b13 - 2\,b03\,b10 + 6\,b00\,b03\big)\,c1\big)\,c4^2 +$$
$$\big(3\,b32^2 + (-2\,b22 - 2\,b12 - 2\,b02)\,b32 + 3\,b22^2 + (-2\,b12 - 2\,b02)\,b22 + 3\,b12^2 - 2\,b02\,b12 + 3\,b02^2\big)\,c3^2 +$$
$$\big((6\,b31 - 2\,b21 - 2\,b11 - 2\,b01)\,b32 + (-2\,b22 - 2\,b12 - 2\,b02)\,b31 + (6\,b21 - 2\,b11 - 2\,b01)\,b22 +$$
$$(-2\,b12 - 2\,b02)\,b21 + (6\,b11 - 2\,b01)\,b12 - 2\,b02\,b11 + 6\,b01\,b02\big)\,c2 + \big((6\,b30 - 2\,b20 - 2\,b10 - 2\,b00)$$
$$b32 + (-2\,b22 - 2\,b12 - 2\,b02)\,b30 + (6\,b20 - 2\,b10 - 2\,b00)\,b22 + (-2\,b12 - 2\,b02)\,b20 + (6\,b10 - 2\,b00)$$
$$b12 - 2\,b02\,b10 + 6\,b00\,b02\big)\,c1\big)\,c3 +$$
$$\big(3\,b31^2 + (-2\,b21 - 2\,b11 - 2\,b01)\,b31 + 3\,b21^2 + (-2\,b11 - 2\,b01)\,b21 + 3\,b11^2 - 2\,b01\,b11 + 3\,b01^2\big)\,c2^2 +$$
$$\big((6\,b30 - 2\,b20 - 2\,b10 - 2\,b00)\,b31 + (-2\,b21 - 2\,b11 - 2\,b01)\,b30 + (6\,b20 - 2\,b10 - 2\,b00)\,b21 +$$
$$(-2\,b11 - 2\,b01)\,b20 + (6\,b10 - 2\,b00)\,b11 - 2\,b01\,b10 + 6\,b00\,b01\big)\,c1\big)\,c2 +$$
$$\big(3\,b30^2 + (-2\,b20 - 2\,b10 - 2\,b00)\,b30 + 3\,b20^2 + (-2\,b10 - 2\,b00)\,b20 + 3\,b10^2 - 2\,b00\,b10 + 3\,b00^2\big)\,c1^2\big)$$
$$/\,16$$
504

$$LB[R] = f(c) = a - b^T c + \tfrac{1}{2} c^T A c$$
506

Figure 5

CHANNEL LOAD BALANCING SYSTEM

TECHNICAL FIELD

The present disclosure relates to channel load balancing systems, such as systems for load balancing modem channels.

BACKGROUND

In a modem termination system (MTS), such as a cable modem termination system (CMTS), there are different kinds of modems, such as DOCSIS 2.0 and DOCSIS 3.0 modems. For efficient usage of a frequency spectrum, modems of an MTS may be balanced online on different channels so that the channels contain a same number of modems. This balancing can be challenging where there are different kinds of modems in a system. For example, balance algorithms between DOCSIS 2.0 and DOCSIS 3.0 are different.

BRIEF DESCRIPTION OF THE DRAWINGS

FIGS. 1-6 describe aspects of an example model implemented by a channel load balancing system (CLBS).

DESCRIPTION OF EXAMPLE EMBODIMENTS

Overview

Figure 2:
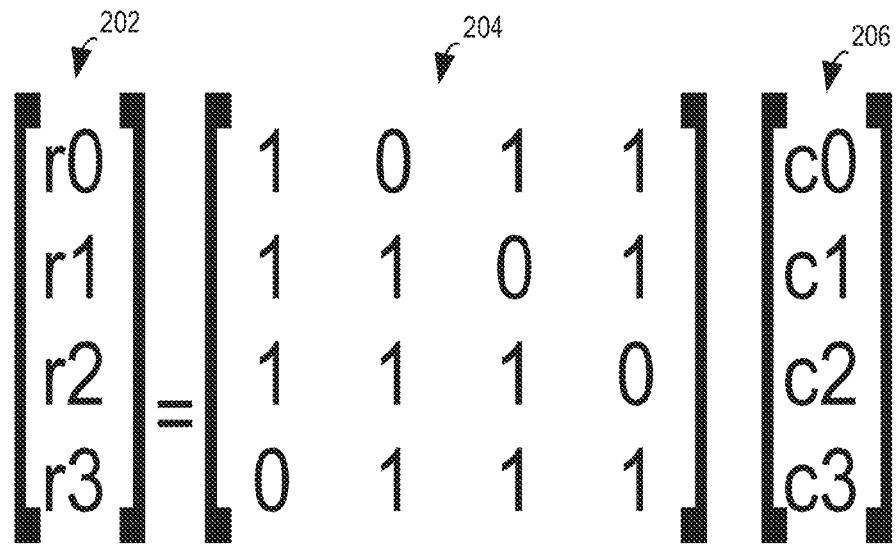

In one example, an apparatus, by a processor, can identify a number of modems in each bonding group of a plurality of bonding groups, resulting in a first data structure. The processor can also determine a configuration for each bonding group of the plurality of bonding groups, resulting in a second data structure. The processor can also determine channel load for each channel of a plurality of channels, according to the first data structure and the second data structure, resulting in a third data structure.

In one example, an apparatus, by a processor, can select a modem from a first bonding group of a plurality of bonding groups to reassign to a second bonding group of the plurality of bonding groups and select the second bonding group. The processor can also calculate a first load balance of a plurality of channels according to the modem and the second bonding group and compare a first variance of the first load balance to a second variance of a second load balance of the plurality of channels. The processor can also direct reassigning the modem from the first bonding group to the second bonding group, where the first variance is less than the second variance.

Example Embodiments

Various embodiments described herein can be used alone or in combination with one another. The following detailed description describes only a few of the many possible implementations of the present embodiments. For this reason, this detailed description is intended by way of illustration, and not by way of limitation.

In one example, one or more apparatuses, such as apparatus(es) including or associated with a channel load balancing system (CLBS), can include one or more modules that can identify a number of modems in each bonding group of a plurality of bonding groups, resulting in a first data structure (C). A bonding group can be a computer network arrangement of multiple network interfaces combined, such as a channel bonding group. Such combined network interfaces may provide redundancy and/or increased throughput and may be a part of one or more electronic devices, such as one or more servers. The module(s) can also determine a configuration for each bonding group of the plurality of bonding groups, resulting in a second data structure (B). The module(s) can also determine a channel load for each channel of a plurality of channels according to the first data structure (C) and the second data structure (B), resulting in a third data structure (R). The module(s) can also use the third data structure (R) to balance the channel loads. In this example, the third data structure (R) can represent channel loads for each channel associated with the plurality of bonding groups.

In one example, the first data structure (C) can be a matrix, the second data structure (B) can be a matrix, and the third data structure (R) may be a matrix. The third data structure may equal the first data structure multiplied by the second data structure (R=BC). The second data structure (B) may include constant values and the first data structure (C) may be adjustable. The adjusting of the first data structure (C) may be used to adjust, such as balance, the third data structure (R). For example, the adjusting of the first data structure (C) may be used to balance channel loads of one or more bonding groups.

In one example, a load balance (LB) of the plurality of channels may be defined by a variance in the channel loads in one or more bonding groups (LB[R]=Var[R]=Var($r_1, r_2, \ldots r_n$)), where Var($r_1, r_2, \ldots r_n$) defines a variance between channel loads $r_1, r_2, \ldots r_n$). In one example, the module(s) can also evaluate the third data structure (R) for each channel of a bonding group, and adjust the third data structure (R) for each channel in the group by adjusting the first data structure (C) for each channel until the variance in the channel loads is less than a predetermined threshold variance. The load balance (LB) may be tolerant to modem reassigning fault and channel fault.

In one example, the adjusting of the first data structure (C) for each channel of a plurality of channels is according to a steepest descent process. The steepest descent process may include reassigning modems to and from each bonding group of the plurality of bonding groups until the variance in the channel loads of the plurality of channels is less than a predetermined threshold variance. The steepest descent process may include adjusting the first data structure (C) for each channel of a plurality of channels according to Equation 1:

$$C_n = C_{n-1} - \frac{d\text{Var}[R]}{dC} \quad (1)$$

The steepest descent process may include adjusting a present first data structure ($C_n$) for each channel of a plurality of channels according to a previous first data structure ($C_{n-1}$) and a derivation of the variance in the channel loads of the plurality of channels, $$\frac{d\text{Var}[R]}{dC}.$$

In one example, the adjusting of the first data structure (C) for each channel of a plurality of channels is according to Equation 2.

$$\operatorname{Var}[R] = f(c) = a - b^T c + \frac{1}{2} c^T A c \qquad (2)$$

In Equation 2, the A, a, and b are constants. The A is a positive definite matrix. T is a transpose operation. The $$\frac{1}{2} c^T A c$$

is in a positive definite quadratic form. The a and b are both derived from the second data structure (B) and c is an input derived from the first data structure (C). The f(c) can be a convex function, and in one example, the local minimum of f(c) may be a global minimum of f(c) for all instances of c.

In one example, a system, such as the CLBS, can include one or more modules that can select a modem from a first bonding group of a plurality of bonding groups to reassign to a second bonding group of the plurality of bonding groups. The module(s) can also select the second bonding group and calculate a load balance of a plurality of channels, such as LB[R], according to the selected modem and the second bonding group. The module(s) can also compare a variance of the load balance, such as $\operatorname{Var}[R_n]$, to a variance of a previous load balance of the plurality of channels, such as $\operatorname{Var}[R_{n-1}]$. Also, the module(s) can reassign the modem from the first bonding group to the second bonding group, where the variance of the load balance is less than the variance of the previous load balance.

In one example, the module(s) can store an identification of the modem and an identification of the second bonding group. The module(s) can also store the load balance and associate the stored identifications to the stored load balance. In one example, the storing of the identifications and the association may occur where the variance of a current load balance is less than the variance of the previous load balance.

In one example, the module(s) may repeat one or more of the abovementioned processes and calculations for each modem of the plurality of bonding groups until no modem can be reassigned (e.g., $\operatorname{Var}[R]=0$) and/or a predetermined minimum variance of respective load balancing is met.

FIGS. 1-6 describe aspects of an example model implemented by the CLBS.

In FIG. 1, "R" represents a matrix that may include a matrix of communications channels, such as radio frequency (RF) channels. For example, in R, there may be a set of $r_i$ channels, wherein i represents an $i^{th}$ channel in a channel load balancing group. In FIG. 1, "C" represents a matrix of modem counts of bonding groups, such as respective amounts of modems in each of the bonding groups. For example, in C, there may be a set of $c_i$ amounts of modems for each bonding group, wherein i represents an $i^{th}$ bonding group. In FIG. 1, "B" represents a matrix that may include respective bonding group configurations for each bonding group. In the example model, R=BC, the values of C can be changed to balance R. In other words, the amount of modems per bonding group can be changed to provide load balancing.

In FIG. 1, for example, a first row 102 of B may be $b_0$=[1 1 1 0]. In bonding group 0, $b_0$, a first channel is configured to have a certain bandwidth configuration, such as 20% of bandwidth, and second and third channels are also configured to have the certain bandwidth configuration, for example. A fourth channel may be configured to have 0% bandwidth. These percentages are examples for purposes of illustrating the model.

In bonding group 1 ($b_1$) 104, the second, third, and fourth channels are configured to have the certain bandwidth configurations. The first channel is configured to have another bandwidth configuration, such as 0% bandwidth.

In bonding group 2 ($b_2$) 106, the first, third, and fourth channels are configured to have the certain bandwidth configurations. The second channel is configured to have another bandwidth configuration, such as 0% bandwidth.

In bonding group 3 ($b_3$) 108, the first, second, and fourth channels are configured to have the certain bandwidth configurations. The third channel is configured to have another bandwidth configuration.

In the example of FIG. 2, R=BC is expressed in matrices. R is represented by matrix 202, B is represented by multi-dimensional matrix 204, and C is represented by matrix 206. R is a counter of modems in the channels and B is a counter of the modems in the bonding groups. As depicted, the first channel ($r_0$) equals a summation of a first amount of modems for a bonding group ($c_0$), a third amount ($c_2$), and a fourth amount ($c_3$), with respect to the respective bandwidth configuration. The second channel ($r_1$) equals a summation of the first amount ($c_0$), the second amount ($c_1$), and the fourth amount ($c_3$), with respect to the respective bandwidth configuration. The third channel ($r_2$) equals a summation of the first amount ($c_0$), the second amount ($c_1$), and the third amount ($c_2$), with respect to the respective bandwidth configuration. The fourth channel ($r_3$) equals a summation of the second amount ($c_1$), the third amount ($c_2$), and the fourth amount ($c_3$), with respect to the respective bandwidth configuration.

Figure 3:
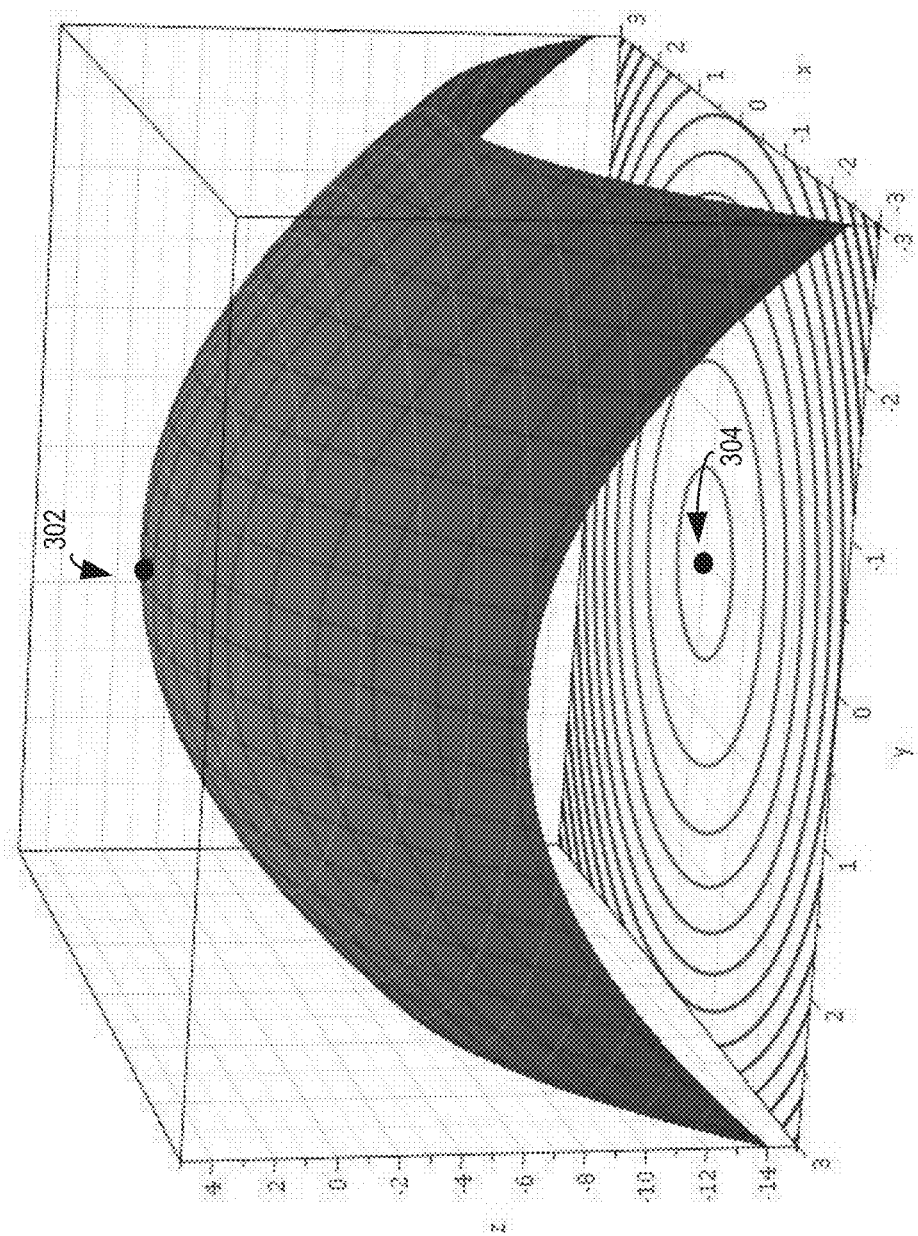

In FIG. 3, depicted is an example of a three-dimensional graph illustrating optimization of the model. Given a function f, from a set A of real numbers, optimization can occur via an element $x_o$ in A such that $f(x_o) \le f(x)$ for all x in A (such as minimization 302) or such that that $f(x_o) \ge f(x)$ for all x in A (such as minimization 304).

Figure 4:
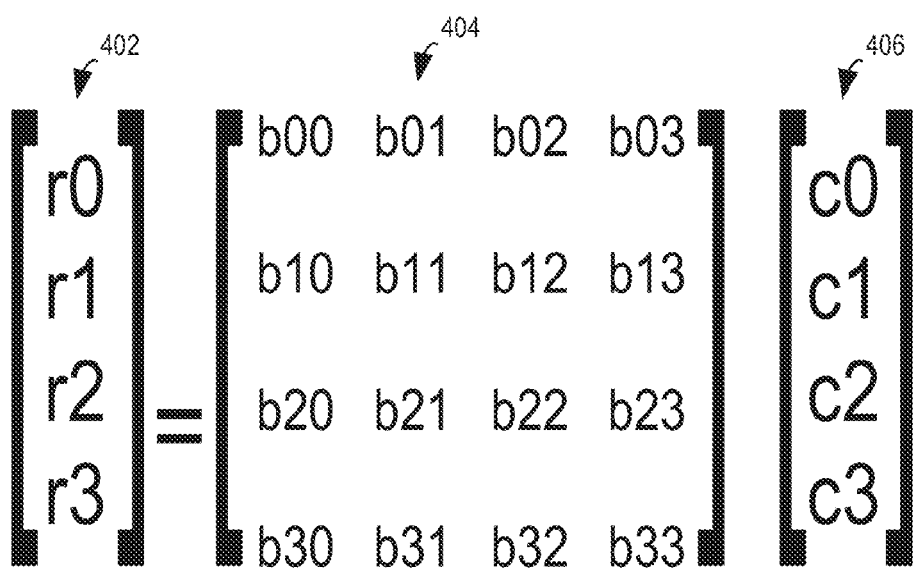

In the example of FIG. 4, depicted is a formula that represents that channel load balance (LB) can be defined by variance in load in each channel, LB[R]=$\operatorname{Var}(r_1, r_2, \ldots, r_n)$. Also depicted in FIG. 4 is the expanded form of R=BC for a four channel bonding group, such as a four RF channel bonding group. Matrix 402 represents R, matrix 404 represents B, and matrix 406 represents C, for a four channel bonding group. FIG. 5 depicts an example of the algebraic equivalents 502 and 504 of the matrix formula of FIG. 4. As depicted, the algebra can be complex. A quadratic equation 506 can represent a formalization of the channel load balance, LB[R]=$f(c)=a-b^T c+\frac{1}{2}c^T A c$. In this equation, the matrix A may be a positive definite, $\frac{1}{2}c^T A c$ may be a positive definite in quadratic form and LB[R] may be a convex function. The local minimum of LB[R] may be a global minimum of LB[R].

Figure 6:
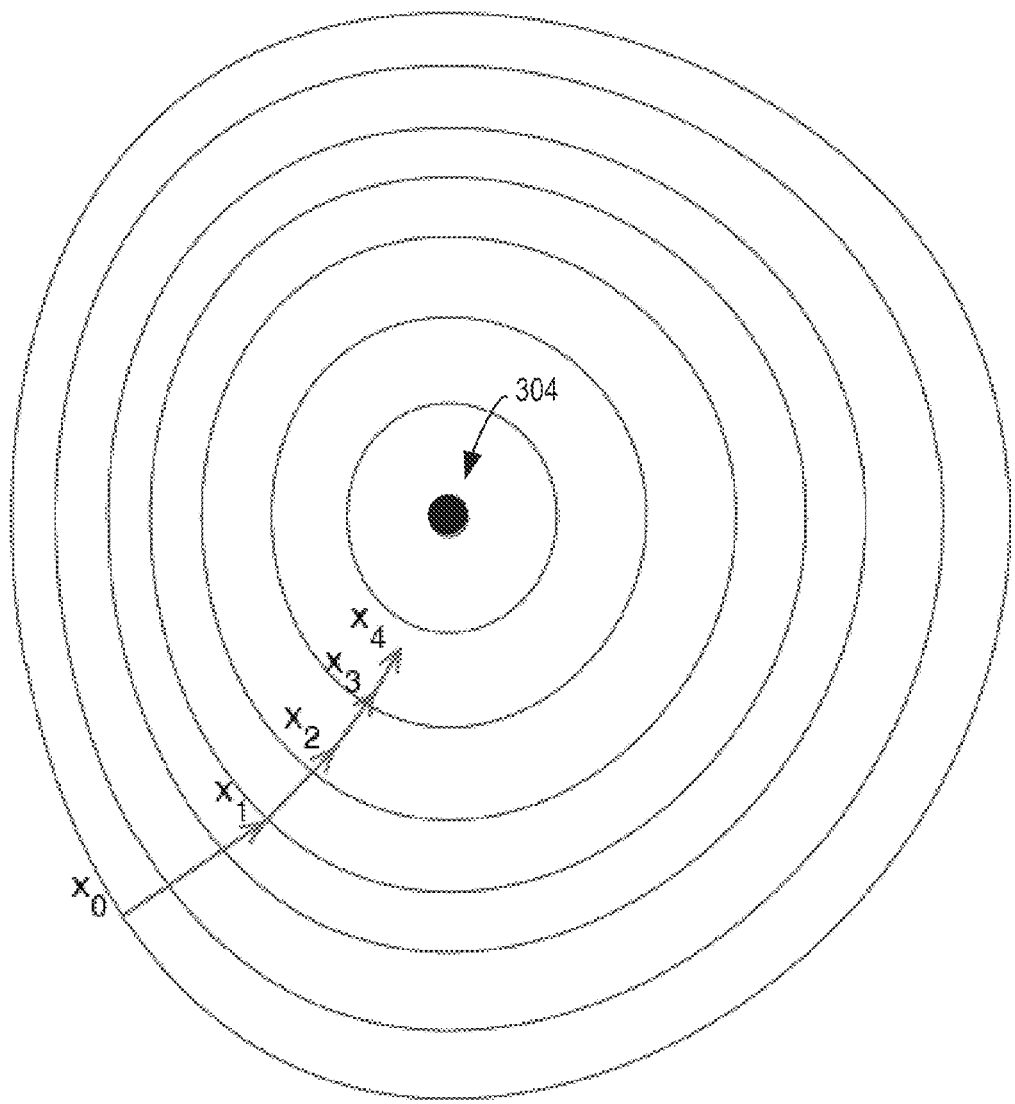

FIG. 6 depicts a top perspective view of the graph depicted in FIG. 3 that illustrates a steepest descent solution (or gradient descent solution). As shown $x_0$ moves towards $x_n$, which is an optimization of LB[R] at minimization 304. Optimization occurs by selecting a modem to reassign to all possible bonding groups and then identify which group makes the channels have minimum variance in load balancing.

In one example, the optimization may include fault tolerance. Fault of reassigning modems can include not being able to reassign a modem communication to a particular channel or a modem rejecting a moving command in general. Fault of channels may include a connection of a channel not being reliable or a high loss of signal or interference in the medium of the channel. For example, a coaxial cable may experience higher loss or interference with some channel frequencies.

The complexity of tolerating these faults and balancing modem groupings can be compounded by upstream and downstream channels. In such cases, the overall load balancing (LB[R]) may equal the load balancing of upstream channels (LB[$R_u$]) combined with the load balancing of the downstream channels (LB[$R_d$]), such as LB[$R_u$]+LB[$R_d$]. Given a function f, LB[$R_u$]+LB[$R_d$], for example, from a set A of real numbers, optimization can still occur via an element $x_o$ in A such that $f(x_o) \le f(x)$ for all x in A (such as minimization 302) or such that that $f(x_o) \ge f(x)$ for all x in A (such as minimization 304).

Figure 7:
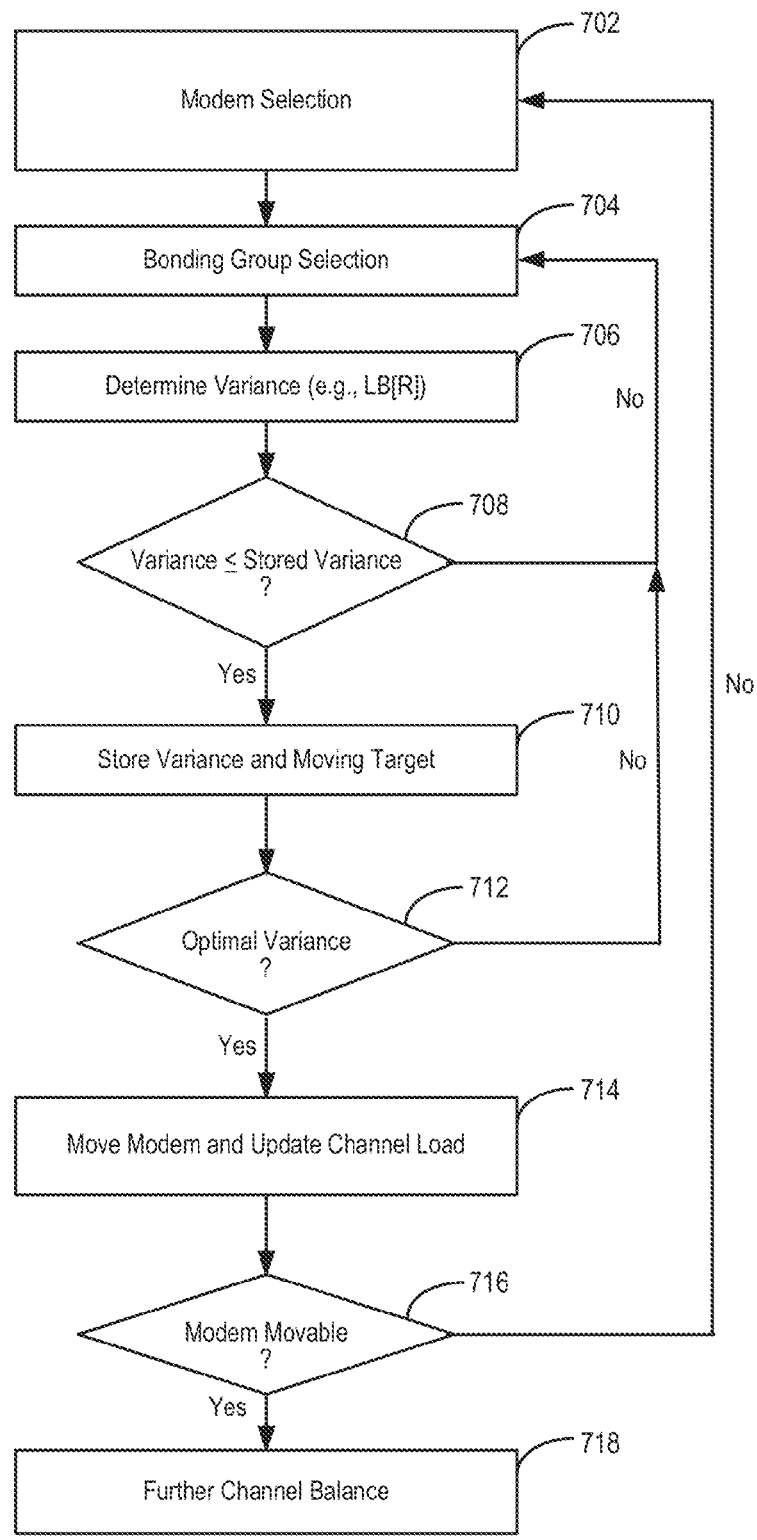
FIG. 7 illustrates a flow chart of an example operation performed by the CLBS.

FIG. 7 illustrates a flow chart of an example operation performed by the CLBS. The operation has at least three processes for optimizing the model. These three processes include selecting a modem, choosing a target bonding group, and reassigning the modem to the target bonding group. Also, these three processes can reoccur until optimization is achieved.

Selection of a modem can occur in a determined order or randomly (such as at 702). In the random example, the CLBS can select a modem from a sampling of modems of a network. For example, where there are n modems, the CLBS may use n/2 modems to select the modem. In such situations, the complexity may be O(n). Where there is a determined sequence of selection, only one step is used to select a modem. The complexity in the determined sequence example may be O(1).

Choosing a target bonding group, such as at 704, includes considering for a modem a certain amount of bonding groups (b) it can belong to and a certain amount of channels (r) it can use. The CLBS may compute the model b times to get the variance (such as LB[R]) for the modem with respect to the amount of bonding groups, such as at 706. The complexity in this example is relative to the number of bonding groups, O(b), and the number of channels, O(r). The total complexity in choosing the target may be O(br).

The CLBS may compare the variance for the modem against a stored variance, such as at 708. The stored variance may be a previous determined variance for that modem, such as the last determined variance for the modem. Where the variance is less than the stored variance at 708, the computed variance may be stored and may replace the previously stored variance, such as at 710. Also, the bonding group that the modem is potentially leaving (the moving target bonding group) may be stored, such as at 710. Where the variance is not better, a new target bonding group is selected, such as at 704.

The CLBS may determine whether the modem is at a bonding group that results in the least variance, such as at 712. Where it is determined that the modem is at the optimal bonding group, the modem may be tagged to not be reassigned to another bonding group for a predetermined amount of time.

The CLBS may also reassign the modem to the target bonding group and update the channel load of the target, such as at 714. The CLBS can also determine whether the modem can be reassigned to that target, such as at 716. Where the modem can be reassigned, the channel may be further balanced and the model further converges, such as at 718. Where the modem cannot be reassigned, another modem is selected, such as at 702.

Reassigning a modem, using steepest descent or gradient descent, reassigns the modem to the best bonding group. In performing the reassignment, where there are n modems, each modem is to be reassigned n times to converge a descent model. The complexity in this case may be O(n). The complexity of the entire model, LB[R] for R=BC, may be O(nrb) for selecting a modem in sequence and O(n2rb) for selecting a modem randomly. The model may be optimized using polynomials. The descent model may be represented by Equation 3.

$$C_n = C_{n-1} - \frac{dLB[R]}{dC} \qquad (3)$$

Practically, the CLBS updates the modem counter C from $C_{n-1}$ to $C_n$ by reassigning a modem from one bonding group to another. The reassignment may be represented by a derivation of the variance in LB[R].

In one example, the model may not support a floating point calculation; however, the variance in LB[R] may be a floating point value. To resolve this contradiction, variance may be compared previous variances and a minimum may be determined. Variance may be converted into a fixed point by rounding the variance to an integer.

Figure 8:
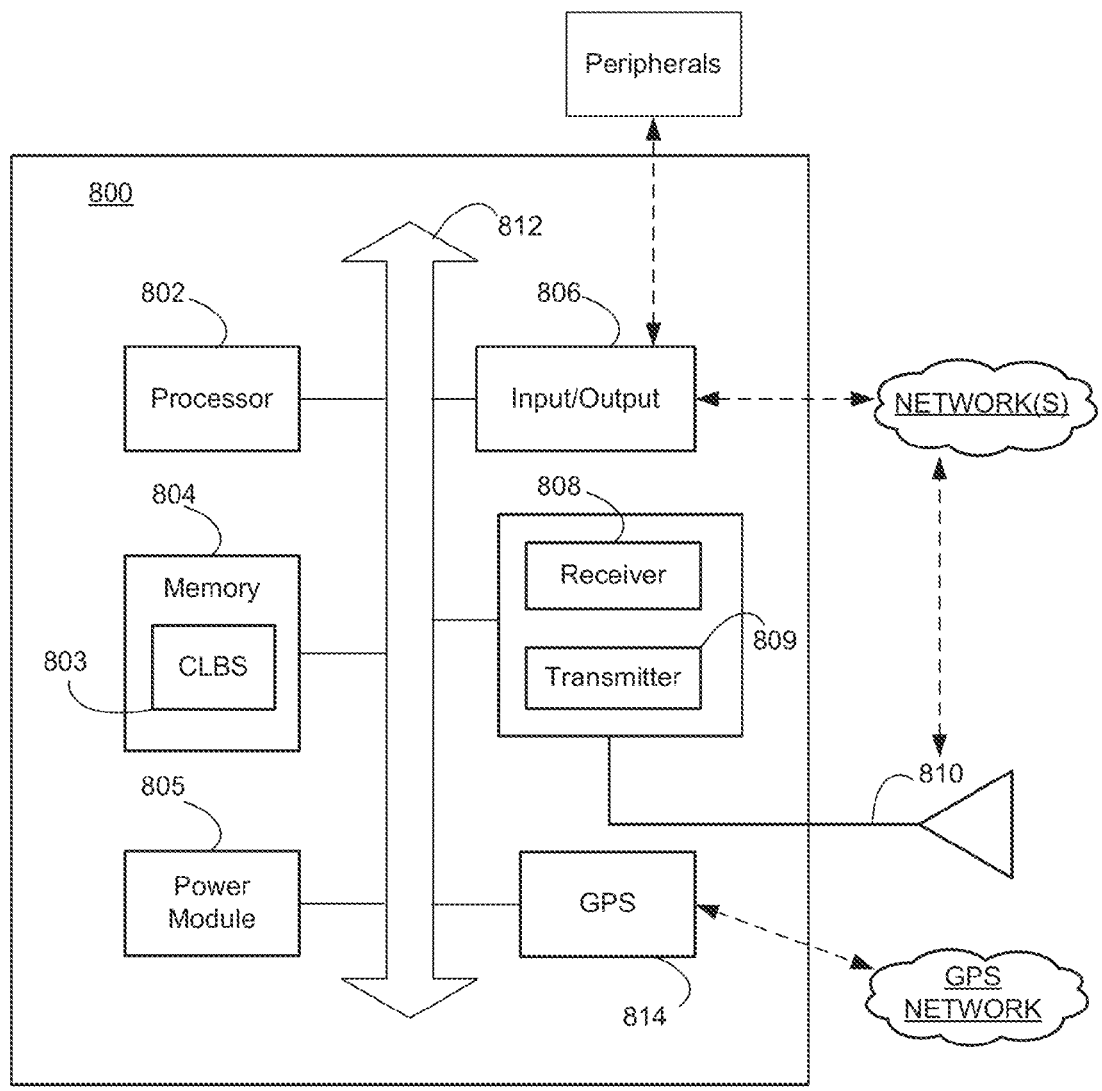
FIG. 8 illustrates a block diagram of an example electronic device of the CLBS that can implement one or more aspects of the model of FIGS. 1-6 and the flow chart of FIG. 7, for example.

FIG. 8 illustrates a block diagram of an example electronic device 800 that can implement one or more aspects of an example CLBS. Instances of the electronic device 800 may be any client device, server, or network node of a network, including a plurality of modems. The electronic device 800, which can be a combination of multiple electronic devices, may include a processor 802, memory 804, a power module 805, input/output (I/O) 806 (including input/out signals, sensors, and internal, peripheral, user, and network interfaces), a receiver 808 and a transmitter 809 (or a transceiver), an antenna 810 for wireless communications, a global positioning system (GPS) component 814, and a communication bus 812 that connects the aforementioned elements of the electronic device 800. The processor 802 can be one or more of any type of processing device, such as a central processing unit (CPU). Also, for example, the processor 802 can be central processing logic; central processing logic may include hardware and firmware, software, and/or combinations of each to perform function(s) or action(s), and/or to cause a function or action from another component. Also, based on a desired application or need, central processing logic may include a software controlled microprocessor, discrete logic such as an application specific integrated circuit (ASIC), a programmable/programmed logic device, memory device containing instructions, or the like, or combinational logic embodied in hardware. In any of these examples, hardware and/or software instructions, such as CLBS instructions 803 included in the memory 804, may implement example aspects of the CLBS. The memory 804, such as RAM or ROM, can be enabled by one or more of any type of memory device, such as a primary (directly accessible by the CPU) or a secondary (indirectly accessible by the CPU) storage device (e.g., flash memory, magnetic disk, optical disk). The power module 805 contains one or more power components, and facilitates supply and management of power to the electronic device 800. The input/output 806, can include any interface for facilitating communication between any components of the electronic device 800, components of external devices (such as components of other devices of the network), and users. For example, such interfaces can include a network card that is an integration of the receiver 808, the transmitter 809, and one or more I/O interfaces. The network card, for example, can facilitate wired or wireless communication with other nodes of the network(s). In cases of wireless communication, the antenna 810 can facilitate such communication. Also, the I/O interfaces, can include user interfaces such as monitors, displays, keyboards, keypads, touchscreens, microphones, and speakers. Further, some of the I/O interfaces and the bus 812 can facilitate communication between components of the electronic device, and in some embodiments ease processing performed by the processor 802. In other examples of the electronic device 800, one or more of the described components may be omitted.

Various embodiments described herein can be used alone or in combination with one another. The foregoing detailed description has described only a few of the many possible implementations of the present embodiments. For this reason, this detailed description is intended by way of illustration, and not by way of limitation.

Furthermore, the separating of example embodiments in operation blocks or modules described herein or illustrated in the drawings is not to be construed as limiting these blocks or modules as physically separate devices. Operational blocks or modules illustrated or described may be implemented as separate or combined devices, circuits, chips, or computer readable instructions.

Each module described herein is hardware, or a combination of hardware and software. For example, each module may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module by a processor can also refer to logic based processing by the module that is initiated directly or indirectly by a processor to complete a process or obtain a result. Alternatively or in addition, each module can include memory hardware, such as at least a portion of a memory, for example, that includes instructions executable with a processor to implement one or more of the features of the module. When any one of the modules includes instructions stored in memory and executable with the processor, the module may or may not include the processor. In some examples, each module may include only memory storing instructions executable with a processor to implement the features of the corresponding module without the module including any other hardware. Because each module includes at least some hardware, even when the included hardware includes software, each module may be interchangeably referred to as a hardware module.

Each module may include instructions stored in a non-transitory computer readable medium, such as memory 804 of FIG. 8, that may be executable by one or more processors, such as processor 802 of FIG. 8. Hardware modules may include various devices, components, circuits, gates, circuit boards, and the like, that are executable, directed, or controlled for performance by the processor 802. Further, modules described herein may transmit or received data via communications interfaces via a network, such as, or including, the Internet. Also, the term "module" may include a plurality of executable modules.

We claim:

1. A non-transitory computer readable medium having stored thereon computer executable instructions embodied in a computer memory and when executed by a processor performs the steps, comprising:

identifying a number of modems in each bonding group of a plurality of bonding groups, resulting in a first data structure;

determining a configuration for each bonding group of the plurality of bonding groups, resulting in a second data structure;

determining a channel load for each channel of a plurality of channels according to the first data structure and the second data structure, resulting in a third data structure;

evaluating the third data structure for each channel of the plurality of channels; and adjusting the third data structure for each channel of the plurality of channels by adjusting the first data structure for each channel of the plurality of channels, until a variance in the channel loads of the plurality of channels identified in the third data structure is less than a predetermined threshold variance, wherein the variance in the channel loads of the plurality of channels defines a load balance of the plurality of channels, and the adjusting the first data structure for each channel of the plurality of channels is according to a steepest descent process that includes adjusting the first data structure for each channel of the plurality of channels according to:

$$C_n = C_{n-1} - \frac{d\text{Var}[R]}{dC},$$

wherein R is the third data structure represented as $R=(r_1, r_2, \ldots r_n)$ such that each $r_i$ (i=1 to n, n being an integer larger than one) represents a load balance of ith channel over the plurality of bonding groups, wherein $C_n$ is a present first data structure represented as $C_n$ ($c_1, c_2, \ldots c_N$) such that each $c_i$ (i=1 to N, N being a count of the plurality of bonding groups) represents an amount of modems in a respective bonding group of the plurality of bonding groups, wherein $C_{n-1}$ is a previous first data structure before adjusting the first data structure, and wherein Var[R] is the variance in the channel loads of the plurality of channels and $$\frac{d\text{Var}[R]}{dC}$$

is a derivation of the variance in the channel loads of the plurality of channels.

2. The non-transitory computer readable medium of claim 1, wherein the first data structure is a matrix, the second data structure is a matrix, and the third data structure is a matrix.

3. The non-transitory computer readable medium of claim 1, wherein the third data structure equals the first data structure multiplied by the second data structure.

4. The non-transitory computer readable medium of claim 1, wherein the second data structure is a constant.

5. The non-transitory computer readable medium of claim 1, wherein the steepest descent process includes reassigning modems to and from each bonding group of the plurality of bonding groups until the variance in the channel loads of the plurality of channels of the third data structure is less than the predetermined threshold variance.

6. The non-transitory computer readable medium of claim 1, wherein the adjusting the first data structure for each channel of the plurality of channels is according to:

$$f(c) = a - b^T c + \frac{1}{2} c^T A c,$$

wherein A, a, and b are constants, wherein A is a positive definite matrix, wherein $\frac{1}{2}c^T A c$ is in a positive definite quadratic form, wherein a and b are both derived from the second data structure, and c is an input derived from the first data structure represented as $C_n$ ($c_1, c_2, \ldots c_N$), wherein f(c) is a convex function representing the variance in the channel loads of the plurality of channels, wherein a local minimum of f(c) is also a global minimum of f(c), and wherein T is a transpose operation.

7. An apparatus comprising:

a non-transitory computer readable medium having stored thereon computer executable instructions and when executed by a processor performs the steps, including:

identifying a number of modems in each bonding group of a plurality of bonding groups, resulting in a first data structure;

determining a configuration for each bonding group of the plurality of bonding groups, resulting in a second data structure;

determining a channel load for each channel of a plurality of channels according to the first data structure and the second data structure, resulting in a third data structure, wherein the first data structure is a matrix, the second data structure is a matrix, and the third data structure is a matrix;

evaluating the third data structure for each channel of the plurality of channels; and adjusting the third data structure for each channel of the plurality of channels by adjusting the first data structure for each channel of the plurality of channels, until a variance in the channel loads of the plurality of channels identified in the third data structure is less than a predetermined threshold variance, wherein the variance in the channel loads of the plurality of channels defines a load balance of the plurality of channels, and the adjusting the first data structure for each channel of the plurality of channels is according to a steepest descent process that includes adjusting the first data structure for each channel of the plurality of channels according to:

$$C_n = C_{n-1} - \frac{d\text{Var}[R]}{dC},$$

wherein R is the third data structure represented as R=($r_1, r_2, \ldots r_n$) such that each $r_i$ (i=1 to n, n being an integer larger than one) represents a load balance of ith channel over the plurality of bonding groups, wherein $C_n$ is a present first data structure represented as $C_n$ ($c_1, c_2, \ldots c_N$) such that each $c_i$ (i=1 to N, N being a count of the plurality of bonding groups) represents an amount of modems in a respective bonding group of the plurality of bonding groups, wherein $C_{n-1}$ is a previous first data structure before adjusting the first data structure, and wherein Var[R] is the variance in the channel loads of the plurality of channels and $$\frac{d\text{Var}[R]}{dC}$$

is a derivation of the variance in the channel loads of the plurality of channels.

8. The apparatus of claim 7, wherein the third data structure equals the first data structure multiplied by the second data structure.

9. The apparatus of claim 7, wherein the second data structure is a constant.

10. The apparatus of claim 7, wherein the steepest descent process includes instructions to reassign modems to and from each bonding group of the plurality of bonding groups until the variance in the channel loads of the plurality of channels of the third data structure is less than the predetermined threshold variance.

11. The apparatus of claim 7, wherein the adjusting the first data structure for each channel of the plurality of channels is according to:

$$f(c) = a - b^T c + \frac{1}{2} c^T A c,$$

wherein A, a, and b are constants, wherein A is a positive definite matrix, wherein $\frac{1}{2}c^T A c$ is in a positive definite quadratic form, wherein a and b are both derived from the second data structure, and c is an input derived from the first data structure represented as $C_n$ ($c_1, c_2, \ldots c_N$), wherein f(c) is a convex function representing the variance in the channel loads of the plurality of channels, wherein a local minimum of f(c) is also a global minimum of f(c), and wherein T is a transpose operation.

12. A method comprising:

identifying a number of modems in each bonding group of a plurality of bonding groups, resulting in a first data structure;

determining a configuration for each bonding group of the plurality of bonding groups, resulting in a second data structure;

determining a channel load for each channel of a plurality of channels according to the first data structure and the second data structure, resulting in a third data structure, wherein the first data structure is a matrix, the second data structure is a matrix, and the third data structure is a matrix;

evaluating the third data structure for each channel of the plurality of channels; and adjusting the third data structure for each channel of the plurality of channels by adjusting the first data structure for each channel of the plurality of channels, until a variance in the channel loads of the plurality of channels identified in the third data structure is less than a predetermined threshold variance, wherein the variance in the channel loads of the plurality of channels defines a load balance of the plurality of channels, and the adjusting the first data structure for each channel of the plurality of channels is according to a steepest descent process that includes adjusting the first data structure for each channel of the plurality of channels according to:

$$C_n = C_{n-1} - \frac{dVar[R]}{dC},$$

wherein R is the third data structure represented as R=($r_1, r_2, \ldots r_n$) such that each $r_i$ (i=1 to n, n being an integer larger than one) represents a load balance of ith channel over the plurality of bonding groups, wherein $C_n$ is a present first data structure represented as $C_n$ ($c_1, c_2, \ldots c_N$) such that each $c_i$ (i=1 to N, N being a count of the plurality of bonding groups) represents an amount of modems in a respective bonding group of the plurality of bonding groups, wherein $C_{n-1}$ is a previous first data structure before adjusting the first data structure, and wherein Var[R] is the variance in the channel loads of the plurality of channels and $$\frac{dVar[R]}{dc}$$

is a derivation of the variance in the channel loads of the plurality of channels.

13. The method of claim 12, wherein the third data structure equals the first data structure multiplied by the second data structure.

14. The method of claim 12, wherein the second data structure is a constant.

15. The method of claim 12, wherein the steepest descent process includes reassigning modems to and from each bonding group of the plurality of bonding groups until the variance in the channel loads of the plurality of channels of the third data structure is less than the predetermined threshold variance.

16. The method of claim 12, wherein the adjusting the first data structure for each channel of the plurality of channels is according to:

$$f(c) = a - b^T c + \frac{1}{2} c^T A c,$$

wherein A, a, and b are constants, wherein A is a positive definite matrix, wherein $\frac{1}{2}c^T Ac$ is in a positive definite quadratic form, wherein a and b are both derived from the second data structure, and c is an input derived from the first data structure represented as $C_n$ ($c_1, c_2, \ldots c_N$), wherein f(c) is a convex function representing the variance in the channel loads of the plurality of channels, wherein a local minimum of f(c) is also a global minimum of f(c), and wherein T is a transpose operation.

* * * * *